United States Patent
Foster et al.

(10) Patent No.: US 6,662,329 B1
(45) Date of Patent: Dec. 9, 2003

(54) PROCESSING ERRORS IN MPEG DATA AS IT IS SENT TO A FIXED STORAGE DEVICE

(75) Inventors: Eric M. Foster, Owego, NY (US); Dennis E. Franklin, Endicott, NY (US); Wai Man Lam, Moheganlake, NY (US); Raymond E. Losinger, Endicott, NY (US); Chuck H. Ngai, Endwell, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/535,001

(22) Filed: Mar. 23, 2000

(51) Int. Cl.[7] .................. G11C 29/00; H04L 1/18; G06F 11/00
(52) U.S. Cl. .................. 714/747; 714/710; 714/704
(58) Field of Search .................. 714/763, 747, 714/764, 746, 704, 710; 365/200, 201; 360/36.1, 36.47, 53

(56) References Cited

U.S. PATENT DOCUMENTS

| | | | |
|---|---|---|---|
| 4,933,939 A | | 6/1990 | Kendall et al. .............. 714/708 |
| 5,212,549 A | * | 5/1993 | Ng et al. .............. 375/240.15 |
| 5,442,400 A | * | 8/1995 | Sun et al. .............. 375/240.15 |
| 5,537,425 A | | 7/1996 | Tsou .......................... 714/805 |
| 5,587,807 A | * | 12/1996 | Ootsuka et al. .............. 386/46 |
| 5,623,470 A | | 4/1997 | Asthana et al. .............. 369/58 |
| 5,663,969 A | * | 9/1997 | Tsou .......................... 714/805 |
| 5,673,363 A | * | 9/1997 | Jeon et al. .................. 704/270 |
| 5,742,623 A | | 4/1998 | Nuber et al. ................ 714/798 |
| 5,805,469 A | * | 9/1998 | Okamoto et al. ........... 702/189 |
| 5,838,678 A | | 11/1998 | Davis et al. ................ 370/389 |
| 6,269,220 B1 | * | 7/2001 | Jeong et al. ................ 386/109 |
| 6,327,689 B1 | * | 12/2001 | Tian .......................... 714/751 |
| 6,381,282 B1 | * | 4/2002 | Kwan et al. ........... 375/240.27 |

FOREIGN PATENT DOCUMENTS

EP  0 790 741 A2  8/1997

OTHER PUBLICATIONS

High Performance Novel Distributed Arithmetic Architecture to Achieve Optimal Error Build Up with Minimal Hardware IBM Technical Disclosure Bulletin, vol. 38, No. 11, Nov. 1995.

* cited by examiner

Primary Examiner—Phung M. Chung
Assistant Examiner—Esaw Abraham
(74) Attorney, Agent, or Firm—Whitham, Curtis & Christofferson, P.C.; William H. Steinberg (57) ABSTRACT

Data corrupted or lost in transmission over a lossy digital transmission link is replaced and/or omitted from data presented in connection with storage to and read out from a mass storage device. Different procedures are used to conceal artifacts corresponding to errored data based upon valid data preceding and following the error in a data stream and a size of the error.

20 Claims, 7 Drawing Sheets

PROCESSING ERRORS IN MPEG DATA AS IT IS SENT TO A FIXED STORAGE DEVICE

BACKGROUND OF THE INVENTION

1. Field of the Invention

The present invention generally relates to transmission and presentation of broadcast digital video and audio program content and, more particularly, to error recovery, deletion and/or concealment of corrupted or missing data transmitted over lossy digital transmission media.

2. Description of the Prior Art

Since its invention, television has been recognized to have great economic and social potential. At the present time, when wide bandwidth transmission systems such as coaxial cable systems are becoming relatively ubiquitous, much of the economic and social potential derives from the variety of programming or other information which can be provided to users and the willingness of users to pay for access to particular information, such as pay-per-view movies at a time convenient to them.

While coaxial cable distribution systems provide very substantial numbers of choices of information available as well as some capacity for so-called upstream signalling and even Internet communications of increased speed relative to telephone/modem arrangements, there is increased demand for wider variety and flexibility of programming which can only be provided, at the present state of the art, through digital communications using extremely broad band transmission media such as microwave, satellite and fiber optic links.

Even with these broad band communication media, the required capacity, the volume and variety of data contained in common programming requires extreme compression to support the number of separate communications which may be required to be transmitted over a communication link of finite although substantial capacity. Accordingly, a compression convention referred to as MPEG (Motion Picture Experts Group has been promulgated in several versions (e.g. MPEG-2) and has become an industry standard. This standard is extremely flexible and adaptive to transmission content to allow extreme compression and is largely compatible with error recovery and hiding arrangements which support acceptable video and audio playback even though the digital transmission medium may be "lossy" and reception of data with missing or corrupted segments or packets is a common occurrence.

In order to implement this compression convention, a so-called "set-top box" (STB) has been developed (referred to as a target decoder under the MPEG standard) and, at the current time, has a well-established architecture. The processing of which the STB is capable is, of course, very substantial since MPEG compression is very complex. While little storage is generally required for decoding within the MPEG decoder architecture, public familiarity with the functions of video cassette recorders (VCRs) has led to a demand for substantial amounts of storage to support similar functions in the STB. Decompression is generally performed in several stages and allows convenient storage in a coded form which is substantially compressed relative to the final displayable format. Therefore, at the present time, provision of substantial storage within the STB and for further storage on an outboard mass storage device such as a hard disk drive or compact disk recorder/playback device is being considered and implemented.

Additionally, user demand for specialized features and image enhancement has required substantially increased complexity beyond the demands of MPEG processing. For example, a separate microprocessor and associated memory is generally included and dedicated to provide user-definable functions such as overlays, picture-in-picture displays, graphics rendering and morphing and other image manipulations. This additional hardware complexity has pushed the cost of the STB close to the limit of consumer acceptance and economic viability. Therefore, additional functions may only be included if they can be implemented very economically with little additional hardware and without use of the additional dedicated microprocessor.

It is desirable to provide error detection and recovery, deletion and/or concealment of portions of digital data that may have been lost or corrupted by transmission over a "lossy" medium. For example, if a video frame is lost or corrupted during transmission and/or reception, it is conventional to replace corrupted image portions with previously received image portions which may or may not be perceptible to a viewer and certainly much less perceptible than display of random video pixels or playing out random noise corresponding to corrupted or missing data in a portion of an image field at random times within the program sequence.

However, there is some difficulty with limited hardware in the reliability of detection of errors and substantial numbers of errors may be undetected in the course of a program; leading to the production of random artifacts in the image or audio. Further, such a simple concealment process, imposed by the limitations on hardware that can be included in a STB, essentially stops motion of video and imposes some readily perceptible artifacts in audio playback until valid data is again detected; either of which becomes irritating and even more readily perceptible to a user as frequency of corruption or loss of data and the amount of corrupted or lost data increases. Further, since only the last valid data is available when an error is detected, the nature of possible corrections that are available is very limited and the severity of artifacts produced cannot be controlled. At the current state of the art, no further improvement in error concealment has been proposed that can be implemented with an economically acceptable amount of additional hardware and/or processing resources.

SUMMARY OF THE INVENTION

It is therefore an object of the present invention to provide improved error recovery in the course of storage of digitally transmitted audio and video signals.

It is another object of the invention to provide improved hiding of reception errors and reduction in number and severity of artifacts from stored digitally transmitted audio and video signals.

In order to accomplish these and other objects of the invention, a method of hiding and/or correcting errors in digitally transmitted signals is provided comprising steps of detecting errored (e.g. erroneous as containing an error) data in buffered data being routed to a mass storage device, writing an address of detected errors in a header of a block or sub-block containing an error, storing the buffered data in the mass storage device, buffering data read out from the mass storage device and detecting a length of an error in the buffered data, and substituting valid data for errored data or omitting errored data based on valid data preceding and following errored data in a data stream to form a corrected data stream.

In accordance with another aspect of the invention, a method of hiding errors in digitally transmitted signals is provided comprising steps of storing digitally transmitted signals in a mass memory device, parsing the digitally transmitted signals upon read out from said mass storage to find valid data preceding and following an error, and determining a hiding procedure for reducing perceptibility of artifacts corresponding to the error based on the valid data preceding and following the error and the size of the error.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
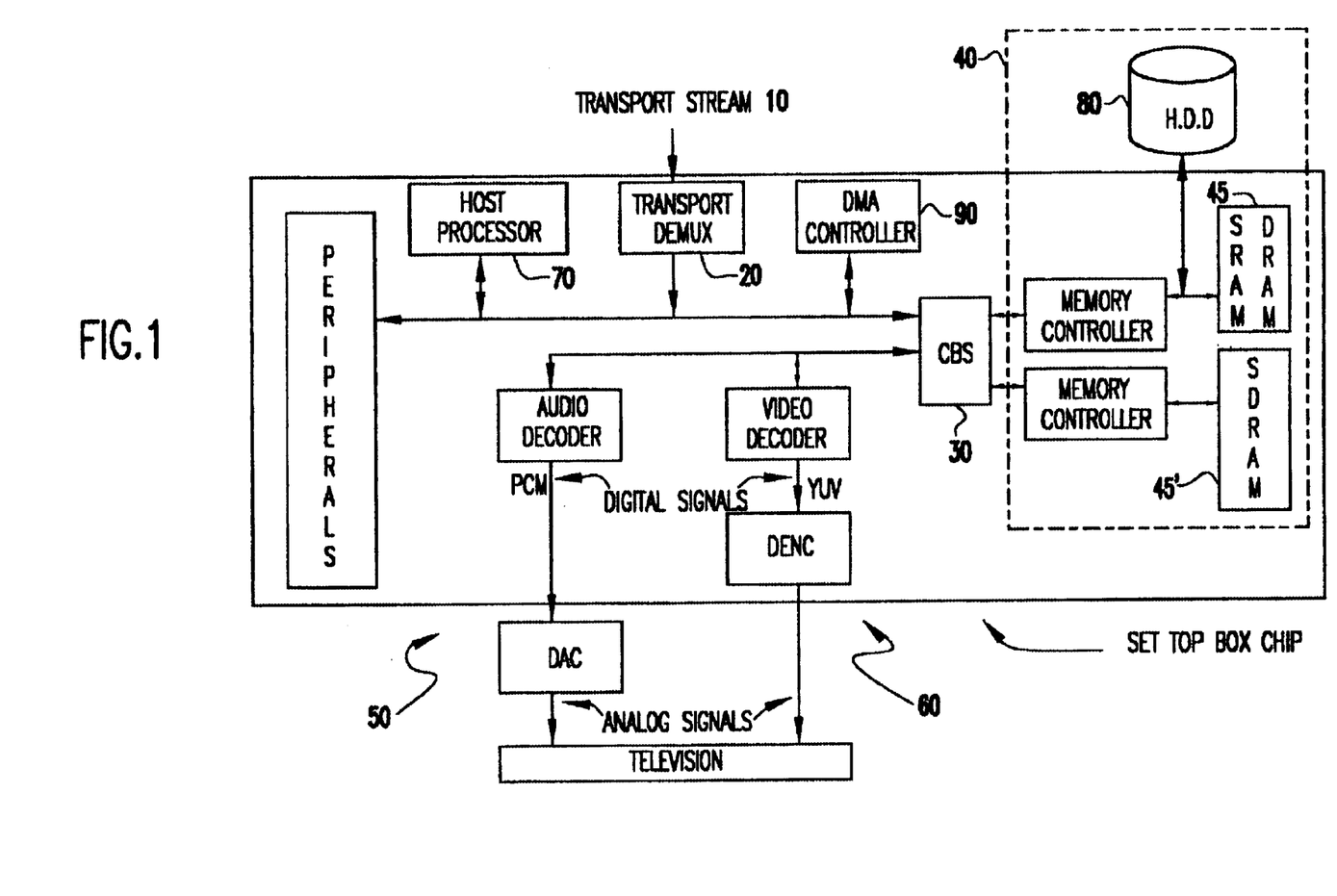
FIG. 1 is a schematic block diagram of the architecture of an MPEG-2 compliant decoder.
Figure 2:
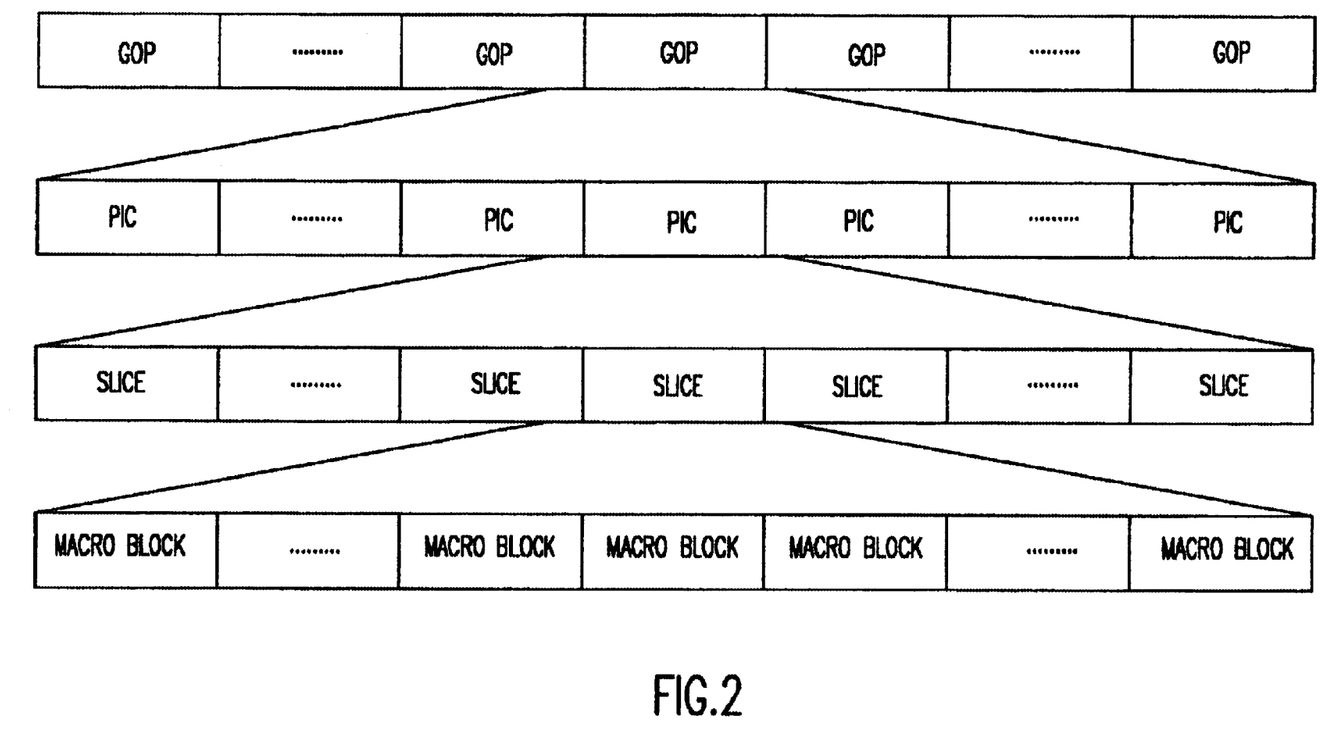
FIG. 2 illustrates organization of video data.
Figure 3:
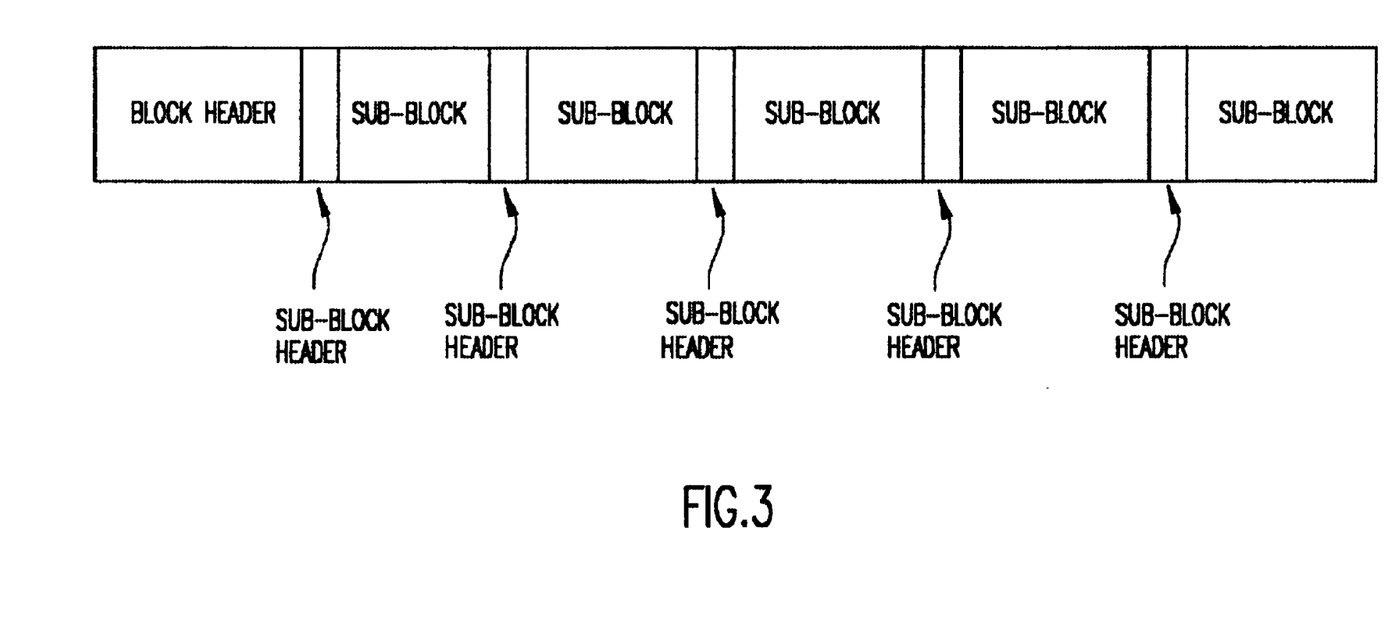
FIG. 3 illustrates data organization of a video block or sub-block.

Referring now to the drawings, and more particularly to FIG. 1, there is shown the basic architecture of an MPEG-2 compliant decoder which is the preferred environment of the invention. It is a feature of the invention that no alteration of this basic architecture is required for implementation of the invention. Therefore, FIG. 1 can be understood as including illustration of the invention. It should also be recognized that some of the dynamic memory and the outboard mass storage device illustrated are not required by the MPEG-2 standard and, while such memory and storage device or port therefor may be included in the MPEG-2 decoder architecture to support other desired functions, important meritorious effects of the invention are derived in connection with them. Similarly, while the overall organization of the data illustrated in FIGS. 2 and 3 are in accordance with the MPEG-2 standard, the invention makes particular use of particular fields therein, as illustrated. For these reasons, no portion of any of FIGS. 1–3 is admitted to be prior art in regard to the present invention.

Nevertheless, much of the architecture illustrated in FIG. 1 is well-understood and need not be discussed in detail. A brief summary thereof will be sufficient for conveying an understanding of the invention sufficient to enable its practice by those skilled in the art.

Basically, a transport stream 10 containing broadcast digital audio and video information is received by the transport demultiplexing unit 20 and converted to a compressed and encoded audio/video data in a packetized elementary stream (PES) format in which the audio and video data are separated into respective groups of data blocks (sometimes referred to as sub-blocks if assembled into larger groups as illustrated in FIG. 3 which is also disclosed, for example, in concurrently filed U.S. patent applications Ser. Nos. 09/534,643 and 09/535,069, assigned to the assignee of the present invention and hereby fully incorporated by reference), each data block containing only audio or video data. If storage for later playback is not provided in the MPEG-2 decoder, these packetized elementary streams are sent to respective audio and video decoder channels 50, 60 which produce signals suitable for application to a television set (e.g. analog audio and PAL or NTSC analog format video) under control of host processor 70 which also supports and controls the operation of various peripheral devices which may be provided but are of no importance to the present invention.

If storage and delayed playback are provided in the STB/decoder, the output of transport demultiplexer 20 is routed, as desired, to one or more of the storage devices collectively indicated by dashed line 40 through a cross-bar switch 30, also controlled by host processor 70. This routing of data to memory may be performed concurrently with routing to decoders 50,60 for concurrent playout through the use of cross-bar switch 30. Host processor may be the same as the dedicated processor alluded to above or a different processor provided for purposes of the invention and potentially other functions. As will become evident from the following discussion, the processing burden placed on host processor 70 in accordance with the invention is minimal and would not generally compromise other user defined functions to any significant degree. On the other hand, the minimal processing burden needed to implement the invention allows an inexpensive processor to be used and inclusion of a separate processor for implementing the invention is economically feasible.

To assist in isolating the data which may contain an error, the transport packets are arranged in packets of the relatively small size of 188 bytes. However, the audio and video decoders must still be able to accommodate errors while maintaining the number and severity of artifacts at a minimum. In current STB designs, errored data is typically handled by detecting corrupted or missing data at the demultiplexer or the audio and video decoders and decoding the good data in a manner that is as effective in concealing the error as possible.

To conceal errored data, the STB typically repeats the last good video frame and repeats and/or mutes the last good audio sequence until valid data is again received. However, as alluded to above, these functions generate perceptible artifacts although the perceptibility is very much reduced relative to a display and/or playout of errored data, assuming errored data is detected. The decoders may not, in fact detect all errored data, given the amount of data which must be processed. A limit on effectiveness of hiding is imposed by the inflexibility of the amount of good data which is substituted when errored or missing data is detected. Nevertheless, given the time constraints on synchronism between audio and video data and the rate of data presentation, no more effective error detection or correction is possible.

The invention provides more effective detection and error concealment by exploiting the increased latency and potential variability of latency of the PES data as it is stored to mass storage as well as the ability to store errored data with the capability to correct or patch the data before playback. In accordance with the MPEG-2 standard, data transferred to the decoders 50, 60, is placed in a queue (which varies in length with the amount of data to be processed) until it is read out for decoding in accordance with presentation time stamps in headers of the PES packets. Alternatively or concurrently, the PES streams are written to memories 45, 45' directly in the same manner as the placement of PES packets in queues.

Figure 7:
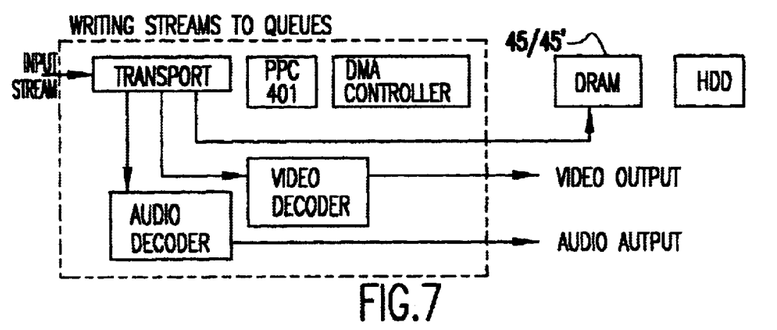
FIGS. 7 and 8, illustrates data flow depicted in the flow chart of FIG. 4.
Figure 8:
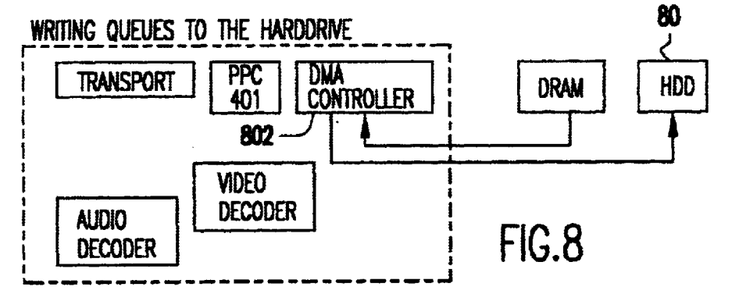

That is, received data can be sent to decoders 50, 60 to be played out or directly stored in memories 45, 45' or both. It is preferable for practice of the invention to initially write directly to these memories 45, 45' because of their more rapid access time and to transfer the data to mass storage 80 in blocks of an arbitrary but fixed size, preferably about one megabyte. Routing is performed by the cross-bar switch 30 and the direct memory access controller 90. The data routes for this two-stage writing process is shown in FIGS. 7 and 8.

The forming of blocks of data written to memory can be configured to result in storage of data in memories 45, 45' for periods at least several times the duration of the presence of any given packet or sub-block in the decoder queues. This period of latency may be easily extended in multiples of the time for forming a data block by the simple expedient of collecting several data sub-blocks before writing to mass memory 80, effectively increasing buffer size and corresponding delay/latency in memory. During this period, the data can be extracted from the blocks or sub-blocks for examination for errors or lost data by more thorough processing than is available at the decoders. This latency also allows a degree of freedom from exact synchronism with the broadcast transmission as well as a more accurate determination of the extent of the errored data and a greater variety of error concealment techniques than can be applied at the decoders 50, 60. The actual processing for correction or concealment of errors in data is performed by the host processor 70 while the data resides in memory 45, 45'.

Referring now to FIG. 2, the organization of PES data will now be described. A video PES data stream is composed of packets of data. The smallest packet corresponds to a display area of 16×16 pixels, referred to as a macroblock. A number of macroblocks (depending on the display format) comprise a slice of the image sixteen pixels tall. A number of slices (again depending on the display format) thus fills the display area and forms a picture (PIC). A sequence of pictures form a group (GOP) and a plurality of groups of pictures form a program or portion thereof. Each of these articulations of data may be considered and handled as a packet which is comprised of a large number of macroblock packets and errored data may be contained in any one or combination of these levels. These packets will also have headers for each packet at each level.

Data collected in data blocks (as distinguished from macroblocks) for transfer to mass storage 80 is organized as illustrated in FIG. 3. For convenience in processing, the packets or sub-blocks are collected in fixed size buffers which are transferred to mass memory 80 when full. A block header containing directory information is applied to each block and each sub-block includes an individual header, as shown. The packet or sub-block header includes information such as a system time clock (STC) stamp, packet length, pointer to a previous packet and a header identification (ID).

Figure 5:
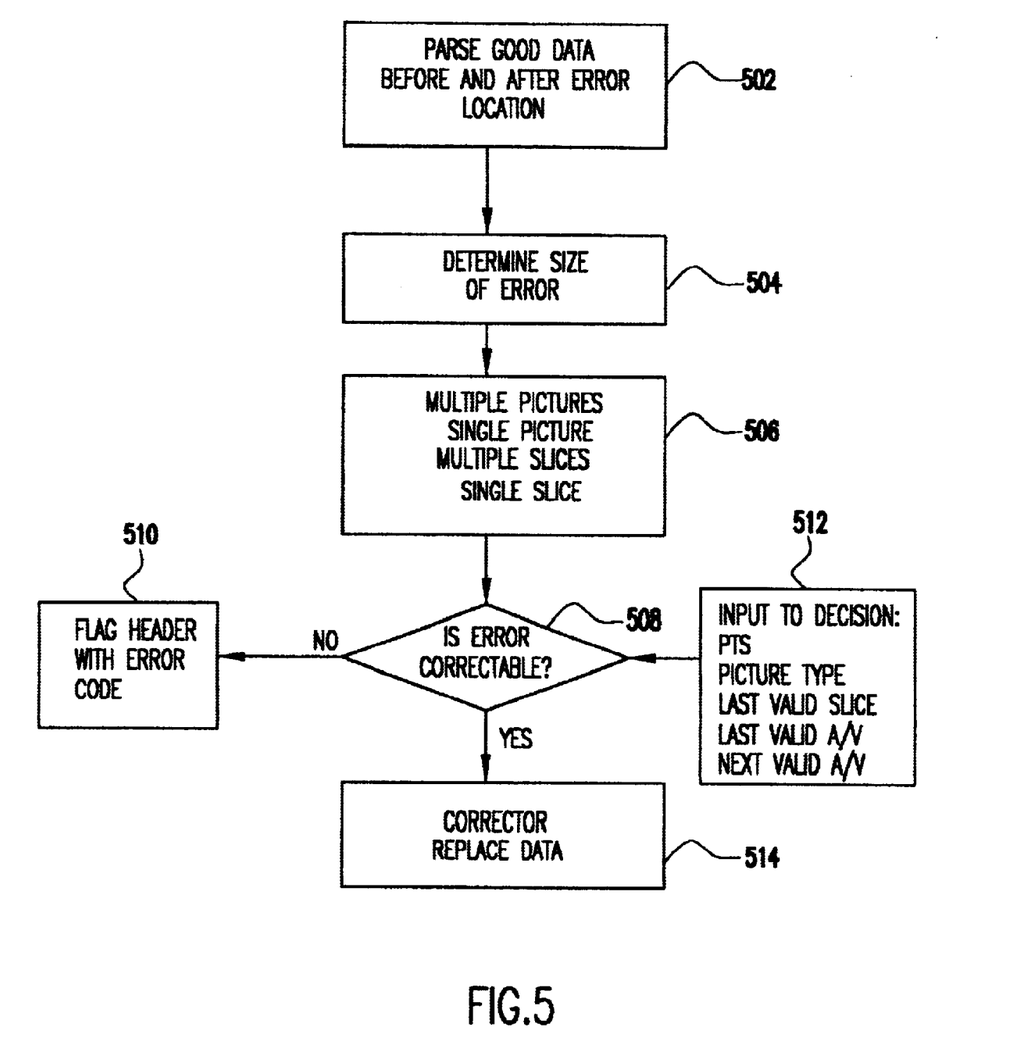
Figure 6:
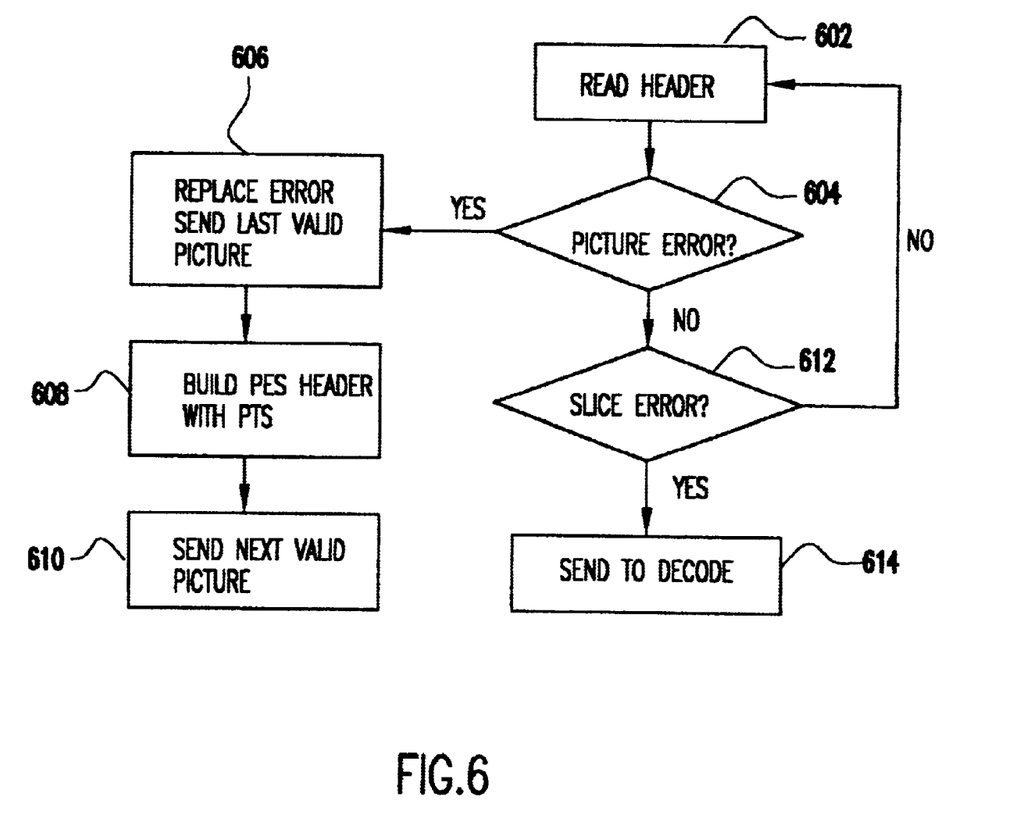

The function of the invention includes three components: identifying errored data and recording the error address in sub-block headers as data is written to the mass storage device 80, parsing good data before and after the error location and carrying out a correction if correction is possible, and removing or replacing errored data which is uncorrectable. (It is often the case that a program may be retransmitted after it is stored and, if so, errored data in storage may be replaced by good data selected from the retransmission.) These component processes in accordance with the invention are illustrated in FIGS. 4, 5 and 6, respectively, and will be described in turn.

Figure 4:
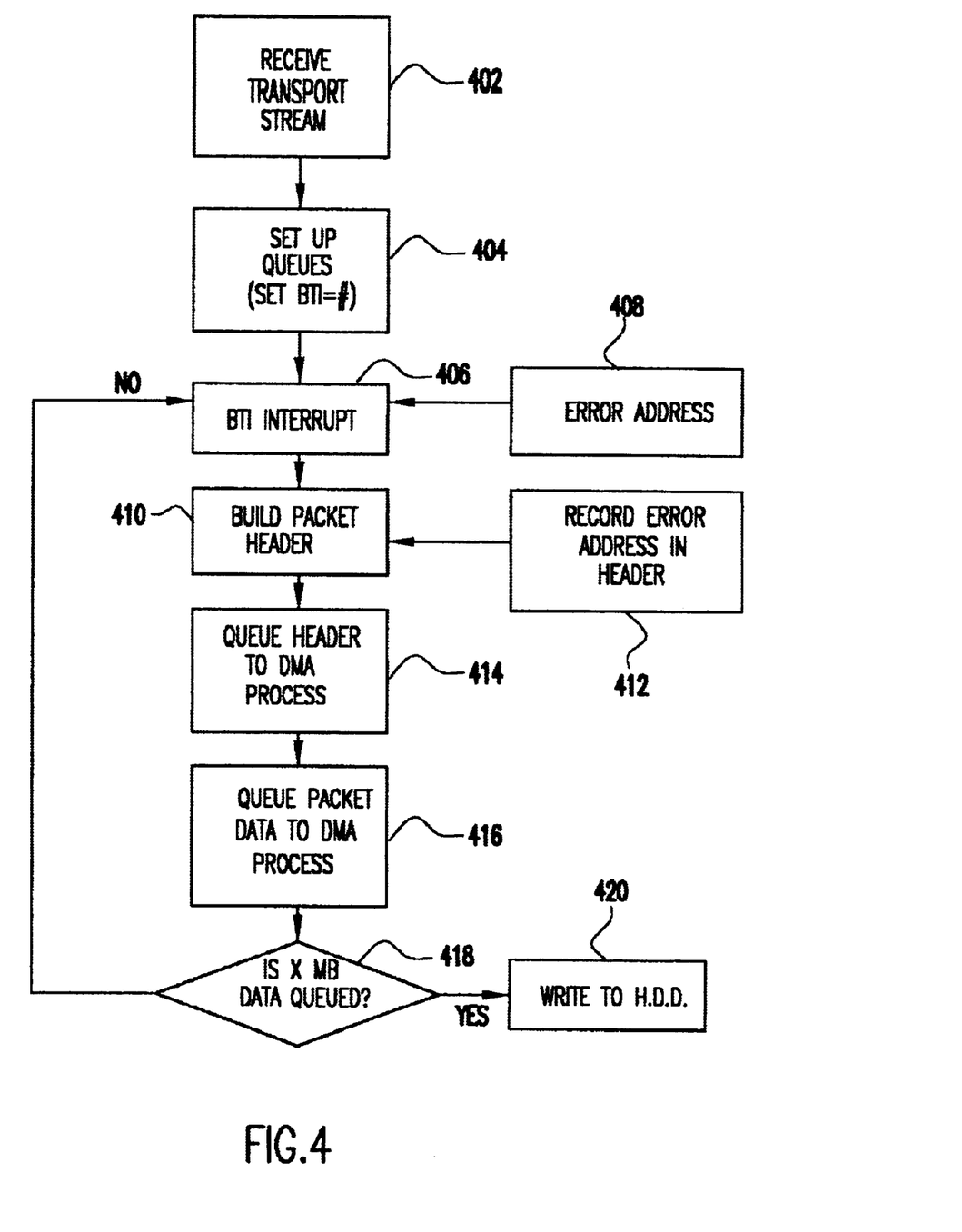
FIGS. 4, 5 and 6 are flow charts illustrating operation of the invention.

Referring to FIG. 4, as the transport data stream is received (402) and processed, audio/video queues may also be set up at inputs to respective decoders. The processed audio/video data is also forwarded to dynamic memory as well. The data flow is illustrated in FIG. 7. At the same time, a substantially arbitrary (for purposes of the practice of this invention) number of boundaries to interrupt (BTI) is set, as illustrated at 404, to establish a fixed size of sub-block of data to be sent to memory before an interrupt is issued.

(BTI processing is a well-understood technique for assuring that buffers of a given size do not overflow or underflow and establish sizes of blocks or sub-blocks of data which are handled together. For example, BTIs are established in multiples of 256 Bytes in accordance with data rates such that audio data is grouped into blocks or sub-blocks of 512 Bytes and video data is grouped into blocks or sub-blocks of 64 Kbytes. A preferred BTI processing technique is set out in detail in concurrently filed U.S. patent application Ser. No. 09/534,643, incorporated by reference above.)

When that number of bytes of data have been sent to memory and a BTI interrupt is issued, as indicated at 406, the data buffering process begins. When an error is detected and errored data is being written to the buffer (e.g. configured in DRAM 45 or 45') the address or possible address range of the errored data (provided at 408) is recorded, preferably in a look-up table, and used to build the sub-block header as indicated at 410, 412 and queued to the direct memory access (DMA) process along with packet or sub-block data, as shown at 414, 416, which will be performed by DMA controller 90. The data flow path for this portion of the process is shown in FIG. 8.

This process is repeated until the buffer is full, as determined at 418 and looping to 406. When the buffer is full, the data is written out to mass storage device 80, as illustrated at 420. Thus the data contained in the mass storage 80 will include addresses of all errors detected and included in the stored data.

Figure 10:
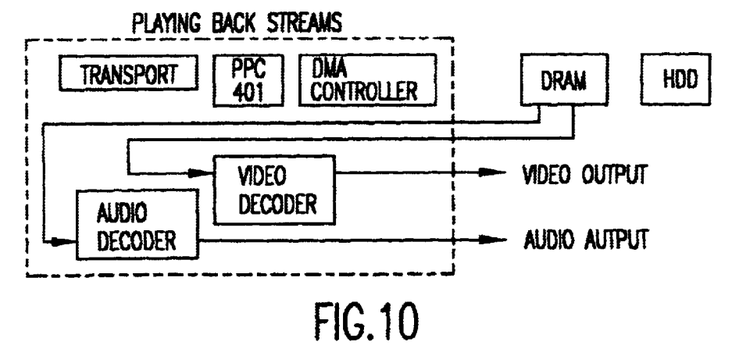
FIG. 10 illustrates data flow during playback from memory.

Referring now to FIGS. 5 and 10, as the data is read out from mass storage 80 (either for playback or error correction without playback), it is again buffered in the DRAM 45, 45'. Again, there is a period of latency (which may be extended if readout is for error correction only and playback is not occurring) during which the good data before and after the error location is parsed, using the stored address of the missing or corrupted data, as illustrated at 502, and the size of the data is determined, as illustrated at 504.

It should be appreciated that the two periods of data latency in the DRAM are sufficient for the detection of errors in a more rigorous fashion than can be done in or from the decoder queue and the storage and retrieval of error addresses allows very rapid evaluation of the size of the errors to control the type of correction or hiding which will be applied. As indicated above, either or both of these periods of latency can be extended at will (since the time of writing to or reading from mass storage 80 may be freely altered) to accommodate the processing which is performed; the particulars of which are not important to the basic principles of the invention.

It should also be appreciated that buffering of data also allows concurrent access to good data on both sides of the error in the data stream. That is, during ordinary real-time decoding of the PES stream after reception and demultiplexing, there is no history file to allow inspection of good data at both ends of the error and thus error size cannot be determined, much less used to enhance correction or hiding of artifacts and errors. It is preferred for practice of the invention at the present time, that the size of the error be categorized (506) as multiple picture (e.g. GOP), single picture (e.g. PIC), multiple slice, single slice or macroblock, generally corresponding to the hierarchy of the data organization illustrated in FIG. 2.

Based on the Presentation Time Stamp, picture type, last valid slice, the last valid audio or video and the next valid audio or video are examined in regard to the identity (e.g. picture, slice, etc.) of the type of error, the location in the stream and the nature of the image. It is then determined if the error is correctable, as illustrated at 508. If the errored data is correctable, it is replaced with data based on either or both of the last and next valid data with or without interpolation (e.g. "inbetweening"). Corrections of different types may be performed based on any of the data considered in determining correctability or any combination thereof; presently preferred forms of correction being discussed below. If the error is not correctable, the sub-block or block header(s) of one or more sub-blocks or blocks containing errored data is flagged with an error code.

Before proceeding to a discussion of the correction process in regard to FIG. 6, it: should be understood that the invention can be practiced in either of two ways within the MPEG-2 compliant decoder of FIG. 1. Specifically, the data flow illustrated in FIG. 9, in which data is read out from mass storage 80 to DRAM 45, 45' where errors are corrected insofar as possible, can be followed directly by playing out the corrected data to the decoders for presentation. The error correction burden on the decoders will be much reduced relative to substantially real-time presentation of received program data and perceptibility of artifacts will be much more fully hidden. However, the corrected data will not be stored unless concurrently forwarded back to another file in the mass storage 80 by cross-bar switch 30. Playback can proceed concurrently with correction or hiding of errors but the effect of, for example, a channel change will be delayed by the period of latency in memory.

Figure 9:
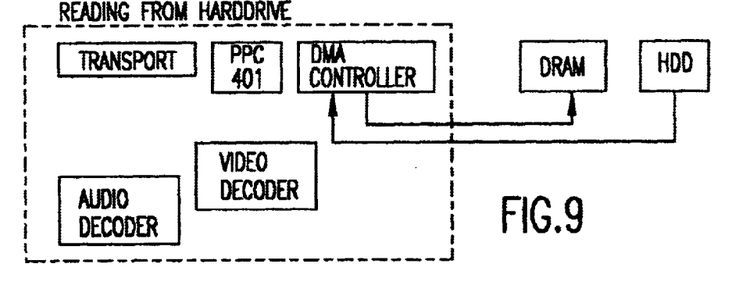
FIG. 9 illustrates the data flow in which data read out from mass storage.

It is also possible to practice the invention with storage directly back to the mass storage 80 employing the data flow path of FIG. 8 subsequent to that of FIG. 9 to, in essence, clean the copy in storage which can then be played back somewhat more conveniently since buffering latency for correction will no longer be required. This may be of importance to accommodate functions such as a forward or backward search mode requiring accelerated retrieval from memory. This latter mode could also be arranged to be performed automatically after a recording of a program is completed and can include the use of data from a retransmission to replace errored data as alluded to above. Correction in this latter mode may be possible to execute more quickly in potentially much less time than the program duration since valid data need not be processed for correction at all and synchronism with a television display for playback need not be maintained. Accordingly, in the following discussion of FIG. 6, the word "sent" is intended to be understood in the generic sense of sending corrected data to either the mass storage 80 or the decoders or both.

Referring now to FIG. 6, the header of each block (or sub-block) is read in turn and checked for error address data and error flags indicating uncorrectable errors. If a picture error is discovered at 604, the last picture or similar reconstructed image is sent and a header is built having an appropriate presentation time stamp (PTS) as illustrated at 608 and applied to the next valid picture and sent; skipping further invalid/errored pictures. This procedure greatly reduces the perceptibility of the repeated picture artifact which would otherwise be produced by the decoders to maintain consistency with respective presentation time stamps when an error extends over a plurality of pictures.

If the error, as indicated in the sub-block or block header is not a picture error, it is determined if the error is a slice error at 612. If the error is a slice error or a multiple slice error, it can be sent (to the decoders, the mass storage 80 or both), as illustrated at 614 since it is less than a single picture and correction can readily be made from the last valid data through the normal function of the decoders. If the error is neither a slice error nor a picture error (e.g. flagged as uncorrectable) the process loops back to 602 and the errored data is never sent. The corresponding artifact will correspond to a splice in a motion picture film where damaged frames are removed and may even be less perceptible than the artifact resulting from correction of a multiple picture error, discussed above, in which a preceding picture is repeated a single time. Alternatively, a large multi-picture error can be replaced from preceding and/or following data, with or without interpolation and small macroblock errors can be replaced from preceding or following data by appropriate control signals sent to the decoders.

In view of the foregoing, it is seen that the invention, by providing error correction in connection with recording of a program to mass storage, such as a hard disk drive (HDD) or compact disk (CD) recorder/player improved error detection and improved error correction/hiding with reduced perceptibility of artifacts can be achieved while reducing processing burdens on decoders. The data is stored in a coded and compressed form to reduce required storage capacity and data is, in general, somewhat further compressed by the action of the invention since multiple picture and uncorrectable errors are removed.

While the invention has been described in terms of a single preferred embodiment, those skilled in the art will recognize that the invention can be practiced with modification within the spirit and scope of the appended claims.

We claim:

1. A method of hiding errors in a streaming broadcast of digital media signals comprising steps of:
   detecting erroneous data in buffered data being routed to a mass storage device, storing an address of errors detected by said detecting step,
   storing said buffered data in said mass storage device,
   buffering data read out from said mass storage device and detecting a length of an error in said buffered data, and
   substituting valid data for erroneous data or omitting erroneous data based on valid data preceding and following the erroneous data in a data stream to form a corrected data stream.

2. A method as recited in claim 1, including the further step of
   storing said corrected data stream in said mass storage device.

3. A method as recited in claim 1, including the further step of
   decoding said corrected data stream for playback.

4. A method as recited in claim 1, including the further steps of
   storing said corrected data stream in said mass storage device, and concurrently
   decoding said corrected data stream for playback.

5. A method as recited in claim 1, including the further step of substituting a decoder command for erroneous data.

6. A method as recited in claim 1, including the further step of recording an address of erroneous data in a look-up table.

7. A method as recited in claim 1, wherein said address or errors is written in a header of a block or sub-block of said digitally transmitted signals.

8. A method as recited in claim 1, wherein said valid data is obtained from another data stream corresponding to said data stream containing said errored data.

9. A method as recited in claim 8, wherein said another data stream is a retransmission of said digitally transmitted signals.

10. A method of hiding errors in a streaming broadcast of digital media signals comprising steps of:

storing said digitally transmitted signals in a mass storage device, parsing said digitally transmitted signals upon read out from said mass storage device to find valid data preceding and following an error, and determining a hiding procedure for reducing perceptibility of artifacts corresponding to the error based on said valid data preceding and following the error and the size of the error.

11. A method as recited in claim 10, including the further step of storing said corrected data stream in said mass storage device.

12. A method as recited in claim 10, including the further step of decoding said corrected data stream for playback.

13. A method as recited in claim 10, including the further steps of storing said corrected data stream in said mass storage device, and concurrently decoding said corrected data stream for playback.

14. A method as recited in claim 10, including the further step of substituting a decoder command for erroneous data.

15. A method as recited in claim 10, including the further step of recording an address of erroneous data in a look-up table.

16. A method as recited in claim 10, wherein said valid data is obtained from another data stream corresponding to said data stream containing said errored data.

17. A method as recited in claim 16, wherein said another data stream is a retransmission of said digitally transmitted signals.

18. A method as recited in claim 1, wherein said storing step stores an address of errors detected by said detecting step in a block or sub-block containing an error.

19. A method of hiding errors in a streaming broadcast of digital media signals comprising steps of:

detecting erroneous data in buffered data being routed to a mass storage device, storing an address of errors detected by said detecting step, storing said buffered data in said mass storage device, buffering data read out from said mass storage device and detecting a length of an error in said buffered data, receiving a repeat broadcast of the digital media signals, monitoring the repeat broadcast for error-free data corresponding to the erroneous data, and storing the error-free data from the repeat broadcast corresponding to the erroneous data.

20. A method as recited in claim 19 wherein the error-free data from the repeat broadcast is substituted for the erroneous data.

* * * * *